US010961077B2

(12) United States Patent
Thoresen

(10) Patent No.: US 10,961,077 B2
(45) Date of Patent: Mar. 30, 2021

(54) SYSTEM AND A METHOD FOR HANDLING, STORING AND TRANSPORTATION

(71) Applicant: PASSER as, Vear (NO)

(72) Inventor: Øyvind Thoresen, Larvik (NO)

(73) Assignee: PASSER as, Vear (NO)

(*) Notice: Subject to any disclaimer, the term of this patent is extended or adjusted under 35 U.S.C. 154(b) by 0 days.

(21) Appl. No.: 16/472,261

(22) PCT Filed: Dec. 19, 2017

(86) PCT No.: PCT/EP2017/083513
§ 371 (c)(1),
(2) Date: Jun. 21, 2019

(87) PCT Pub. No.: WO2018/122037
PCT Pub. Date: Jul. 5, 2018

(65) Prior Publication Data
US 2019/0322479 A1 Oct. 24, 2019

(30) Foreign Application Priority Data
Dec. 27, 2016 (NO) .................................. 20162063

(51) Int. Cl.
*B65H 49/28* (2006.01)
*B65H 49/34* (2006.01)
*E21B 19/22* (2006.01)

(52) U.S. Cl.
CPC ............. *B65H 49/28* (2013.01); *B65H 49/34* (2013.01); *E21B 19/22* (2013.01)

(58) Field of Classification Search
CPC .......... B65H 49/28; B65H 49/34; E21B 19/22
See application file for complete search history.

(56) References Cited

U.S. PATENT DOCUMENTS 2,558,311 A * 6/1951 Morrow ................. B60G 11/15
267/275
3,941,146 A 3/1976 Chatard et al.
(Continued)

FOREIGN PATENT DOCUMENTS

CN 203394390 U 1/2014
JP S59-27745 A 2/1984
(Continued)

OTHER PUBLICATIONS

International Search Report issued in Application No. PCT/EP2017/083513, dated May 3, 2018 (6 pages).
(Continued)

*Primary Examiner* — Saul Rodriguez
*Assistant Examiner* — Ashley K Romano
(74) *Attorney, Agent, or Firm* — Osha Bergman Watanabe & Burton LLP

(57) ABSTRACT

A system for handling, storing and transportation of an elongated element, the system includes a basket suitable for rotation about a central vertical axis. The basket includes an interior upright wall surrounding the central vertical axis, an exterior upright wall spaced from and exterior to the interior upright wall. The interior and exterior upright walls are connected to a floor, thereby defining an open-topped chamber for receiving the elongated element. The system further includes a plurality of pedestals and a transportable drive unit. The basket, on a surface of the floor facing the plurality of pedestals and the transportable drive unit, is provided with interfaces which cooperate with corresponding interfaces provided in the plurality of pedestals and the transportable drive unit.

19 Claims, 8 Drawing Sheets

(56) References Cited

U.S. PATENT DOCUMENTS

Figure 1:
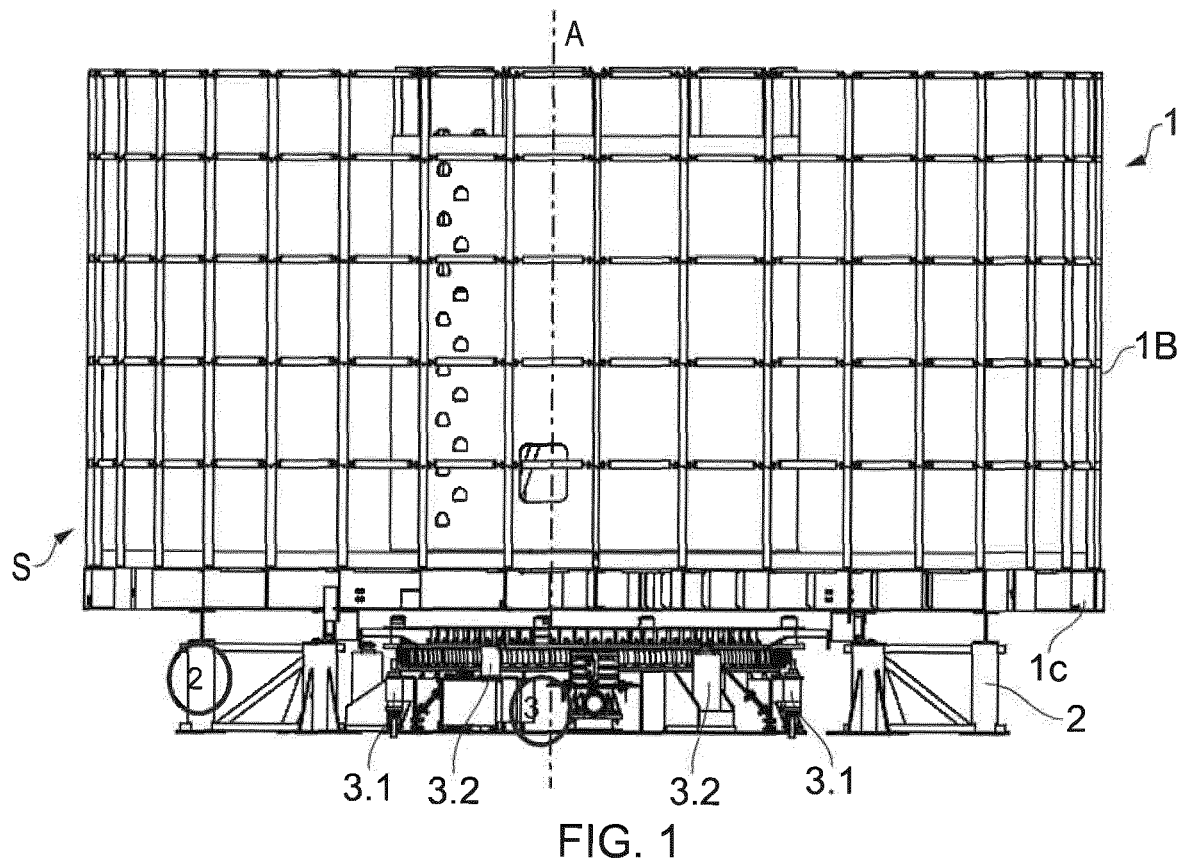

| | | | |
|---|---|---|---|
| 3,965,713 A | 6/1976 | Horton | |
| 4,184,647 A | 1/1980 | Rourke | |
| 2002/0195255 A1 | 12/2002 | Reilly | |
| 2007/0085377 A1* | 4/2007 | Boucher | B60J 1/2002 |
| | | | 296/180.2 |
| 2010/0147988 A1 | 6/2010 | Baxter | |

FOREIGN PATENT DOCUMENTS

| | | |
|---|---|---|
| JP | H02-261777 A | 10/1990 |
| JP | 2016-113272 A | 6/2016 |
| WO | 2009/129223 A2 | 10/2009 |
| WO | 2016/140999 A1 | 9/2016 |

OTHER PUBLICATIONS

Written Opinion issued in International Application No. PCT/EP2017/083513, dated May 3, 2018 (8 pages).

International Preliminary Report on Patentability issued in International Application No. PCT/EP2017/083513, dated Jan. 3, 2019 (6 pages).

Search Report issued in Norwegian Application No. 20162063, dated Jul. 3, 2017 (2 pages).

* cited by examiner

SYSTEM AND A METHOD FOR HANDLING, STORING AND TRANSPORTATION

The present invention relates to equipment for holding and storing of elongated elements, and more particularly to a system for handling, loading and transporting of elongated elements, such as ropes, cables, flexible pipes or control umbilicals including electrical cables.

The present invention relates also to a method for holding, handling, transport and storing of elongated elements.

In the oil & gas and energy industry, flexible and semi-flexible tubular goods and cables are stored and transported on reels or carousels. The rotating axes of spools are orientated either horizontally or vertically.

Carousels are a known means in the offshore industry for the storage, transportation and installation of flexible product (such as flexible pipe, umbilicals etc.). As their name suggests, they comprise a base, an outer wall and a hub or inner wall and are such that the flexible product is spooled onto the base around the hub or inner wall. To aid spooling some or all of the carousels is/are driven by motors to turn around the hub's axis. Carousels can be vertically or horizontally, or at any angle therebetween, and may comprise means to move it between any of these configurations.

WO 2009/129223 A2 relates to a modular rotating carousel assembly for storage and unspooling of pipe or cable, where the modular rotating carousel comprises a plurality of triangular subassemblies; each triangular subassembly comprises a base member and at least one pair of connecting members; the connecting members are connected together at one end to form an apex and are connected at the other end to the base member; the base members of the plurality of triangular subassemblies are rotatably connected together to form a first circle; wherein the apexes of the connecting members extend outwardly from said first circle; and a plurality of rotating caster members is positioned beneath the rotatable connection of a plurality of said base members. A drive mechanism is provided that includes a motor that rotates a perimeter drive chain that engages sprocket pads spaced about the circumference of the carousel.

US 2010/147988 A1 relates to a carousel for the storage of a flexible product, and a method of loading flexible product thereon, wherein said carousel comprises an open drum mounted to rotate around a vertical axis, an elevatable floor, preferably internal to said drum and lifting means for lifting and lowering said elevatable floor. Said lifting means may be located between a base of said carousel and said elevatable floor. Said carousel may be of the type designed for location under deck on a marine pipe-laying vessel, said flexible product being flexible conduit for the transport of hydrocarbons.

US 2002/195255 A1 relates to a method and apparatus for coiled tubing operations, where a coiled tubing rig is operable to simultaneously translate and rotate coiled tubing in a borehole.

U.S. Pat. No. 4,184,647 A relates to a portable electrical cable unwinder comprising a wheeled base with brakes, a rotatable disc upon a thrust bearing, friction supporting retarders, a core frame, and a lid.

WO 2016/140999 A1 relates to a mobile processing frame, where the mobile processing frame includes a base portion having an electrical receptacle and a pneumatic receptacle positioned thereon, a turntable rotatably coupled to the base portion, a motor secured to the base portion and operably connected to the turntable, a mobile support secured to the base portion, opposite the turntable, and a locking member configured to selectively restrict movement of the mobile support. The turntable is configured to receive a processing material thereon and feed the processing material therefrom. The processing system includes the mobile processing frame, a control device, and a transport device configured to move the frame. The method includes positioning a processing material on a frame, moving the frame to a processing area, coupling a control device to the frame, and feeding the processing material from the frame to a processing device.

It is an object of the present invention to minimize and possibly alleviate one or more of the disadvantages of the prior art, or to provide a useful alternative.

This object is achieved with a system and a method for handling, storing and transportation of an elongated element according to the following independent claims, with additional embodiments set forth in the dependent claims.

According to the present invention, it is provided a system for handling, storing and transportation of one or more elongated element(s), where the system comprises a basket which may be arranged to rotate about a central vertical axis, where the basket comprises an interior upright wall surrounding the vertical axis of rotation, an exterior upright wall spaced from and exterior to the interior upright wall, the interior and exterior upright walls being connected to a floor, and where the interior and exterior upright walls together with the floor define an open-topped chamber for receiving the elongated element(s), the system further comprising a plurality of pedestals and a transportable drive unit, wherein the basket on one surface of the floor facing the plurality of pedestals and the transportable unit is provided with interfaces which cooperates with corresponding interfaces provided in the plurality of pedestals and the transportable drive unit.

The transportable drive unit according to the present invention may be a unit which can be moved by external influence, for instance by means of pulling or pushing with one or more winches or the like, or the unit may comprise internal propulsion means, i.e. be a self-propelled unit.

When the transportable drive unit is made as a self-propelled unit, the transportable drive unit may comprise a frame structure, where a plurality of drive motors in appropriate ways are connected to the frame structure. Furthermore, a slew ring bearing is fixed within the frame structure, where the slew ring bearing may comprise a tooth rack. The slew ring will cooperate with the plurality of drive motors in order to be able to rotate the basket when an elongated element is to be spooled on or off the basket.

The transportable drive unit may also comprise two or more beams arranged to extend through the frame structure, where a wheel package can be arranged at each end of each beam. Each wheel package may then comprise one or more wheels, where the wheels may be omnidirectional wheels. Alternatively, the transportable drive unit can be provided with a crawler drive system. A person skilled in the art would know how such wheel packages or crawler drive system should be arranged, whereby this is not described any further herein.

The wheel packages or the crawler drive system may be connected to a driving machinery, which driving machinery may include an electrical power unit, combustion engine(s), electric battery systems etc.

The exterior and/or interior upright wall of the basket may be made from a plurality of dismountable stanchions, where the stanchions are suitable connected to each other in order to accommodate different types of elongated element infeed systems. However, it should be understood that the exterior and/or interior upright wall of the basket also could be manufactured as a plated solid wall, whereby a plurality of plate elements are connected to each other in order to form the wall or walls. In an alternative embodiment one of the walls, for instance the exterior upright wall may be made from a plurality of stanchions, while the interior upright wall may be made from a plurality of plate elements.

The floor of the basket may also be made from a plurality of stanchions or plate elements. Furthermore, the floor may be covered with wood in order to protect the elongated element spooled onto the basket.

The basket may also be provided with at least one lifting yoke, where the lifting yoke may be centrally arranged in the basket. The basket is then designed to be lifted both empty and with full payload. A crane can then be used to lift the basket.

In one aspect of the present invention the basket is provided with a plurality of pedestals, where the plurality of pedestals can be connected to the basket through connection means, for instance one or more quick release couplings, one or more bolts or the like.

In one aspect of the present invention the basket is, on a surface of the floor that faces the transportable drive unit, provided with at least one interface to the pedestals and at least one interface to the transportable drive unit. Such an interface to the pedestals and/or the transportable drive unit may be an opening, a flange, a recess or the like, such that the basket can be supported by the pedestals and/or the transportable drive unit. Furthermore, the at least one interface may be used to "lock" the basket to the pedestals and/or the transportable drive unit, whereby the basket, the pedestals and the transportable drive unit can be transported and/or relocated together as a common unit.

The pedestals are used to support the basket and/or to lock the basket to the pedestals, whereby the pedestals may be arranged around a periphery or in a vicinity of the periphery of the floor of the basket. Each pedestal may be provided with an interface that will cooperate with the interface provided in the floor of the basket, but it is to be understood that the pedestals do not have to be provided with such interfaces. In one aspect, the pedestals may be releasably connected to the floor of the basket, whereby the pedestals must be removed in order to allow the basket to rotate, for instance when the elongated element is spooled on or off the basket. In another aspect, the pedestals may be arranged to be collapsible, whereby the pedestals may be arranged to be rotatable around pivot point(s), such that the pedestals can be rotated from a supportive position to a retracted position underneath the floor of the basket.

Furthermore, in one aspect of the present invention, each of the pedestals may be provided with at least one guide bracket or the like, where the at least one guide bracket will cooperate with deflectors provided around an outer periphery of the transportable drive unit in order to guide and center the transportable drive unit when the transportable drive unit is positioned under the basket.

In another aspect of the present invention each of the pedestals may comprise a rising and lowering system, where the rising and lowering system, for instance, may comprise a plurality of manual hydraulic jacks. Each pedestal may then comprise an upper frame structure adapted to be releasably connected to the basket through appropriate connection means and a lower frame that forms the support towards a surface. The upper and lower frame are connected to each other through a plurality of telescopic elements. The telescopic elements may comprise an outer element and an inner element arranged within the outer element. Furthermore, a plurality of manual hydraulic jacks may be connected between the upper and lower frame of the pedestal, where the telescopic elements are arranged spaced apart over a length of the pedestal. Alternatively, the manual hydraulic jacks may be connected to the telescopic elements, where one end of a hydraulic jack can be connected to the outer element of the telescopic element and an opposite end of the hydraulic jack can be connected to the inner element of the telescopic element.

The outer and inner element of the telescopic element may be provided with a plurality of throughgoing opening along a length of each element, such that each telescopic element can be locked in a desired position when the throughgoing openings of the outer and inner elements of each of the telescopic element are aligned or are in line with each other. Locking bolts or the like may then be used to lock the outer and inner element of the telescopic element relative each other.

The pedestals may, through the rising and lowering system, be brought between an inactive and retracted position beneath the floor of the basket and an active and extended position where the pedestals will support the basket. Through this arrangement, the pedestals will not have to be removed during spooling operations of the basket, as the pedestals can be brought to the inactive and retracted position. Such an arrangement will also cause that the pedestals can be transported together with the basket when the basket is to be transported or relocated to another location.

The rising and lowering system of the pedestals, i.e. the hydraulic jacks may be connected to a monitoring and control system, where such a system may monitor and control each pedestal and/or each hydraulic jack individually and/or together.

The transportable drive unit preferably comprises a plurality of drive motors arranged at a distance from each other and around an outer and/or inner periphery of the transportable drive unit, but it should be understood that the transportable drive unit also may comprise only one drive motor. If, for instance, the transportable drive unit comprises three drive motors, the drive motors may be arranged with an angle of 120 degrees between them. However, it should be understood that the drive motors may be arranged with any desirable angle between them.

The drive motors are preferably bi-directional motors, such that the basket can be rotated both clockwise and anti-clockwise when an elongated element is to be spooled on or off the basket.

The transportable drive unit may also comprise a turning and bearing arrangement to rotate the basket in the form of a slew ring bearing, a roller ring bearing or the like provided with a tooth rack, whereby the drive motor or drive motors is/are provided with a corresponding pinion.

The transportable drive unit may be provided with a plurality of wheels and/or wheel packages and may be moved by means of pulling or pushing with one or more winches or the like. However, it should be understood that the transportable drive unit also may be provided as a self-propelled unit. Alternatively, the transportable drive unit may, instead of plurality of wheels, and/or wheel packages be provided with belts or the like, in order to allow the transportable drive unit to be moved.

Furthermore, the transportable drive unit, when the transportable drive unit is not self-propelled, may be provided with a plurality of spaced apart wheel packages, where the wheel packages are arranged at any given diameter of the basket. In one preferred embodiment of the present invention the wheel packages are releasably connected to the transportable drive unit, but it should be understood that the wheel packages can also be permanently fixed to the transportable drive unit.

Each of the wheel packages may comprise a spring device, where the spring device will be compressed when the transportable drive unit is subjected to a predetermined load, for instance when the basket is arranged on the transportable drive unit, whereby wheels of the wheel packages will be pushed into a cavity of the wheel packages, such that the transportable drive unit is "secured" to a surface on which it is arranged. Once the basket is removed from or lifted off the transportable drive unit, the spring device will force the wheels of the wheel packages out from the cavity and into contact with the surface. The transportable drive unit can now be removed or driven away from the basket.

The transportable drive unit, when the transportable drive unit is self-propelled, may be provided with hydraulics or the like for rising and/or lowering of the transportable drive unit, such that the transportable drive unit can be brought into or out of abutment with the basket.

The transportable drive unit, whether the transportable drive unit is a self-propelled unit or not, may be provided with passive or active balancing systems in order to keep or hold the basket and the transportable drive unit in a horizontal position independent of the nature of the ground. A person skilled in the art would know how such passive or active balancing systems should be arranged and this is therefore not described further herein.

In one aspect, when the transportable drive unit is self-propelled, the transportable drive unit may be used to move the basket and pedestals between different locations when the pedestals are connected to the basket. The basket may be empty or full.

The transportable drive unit may also be provided with a plurality of spaced apart vertically arranged jacking cylinders. The jacking cylinders are arranged such that when they are extended, an upper surface of the jacking cylinder will be brought into contact with a corresponding interface provided in the floor of the basket.

According to the present invention it is also provided a method for handling, storing and transportation of an elongated element, where the method comprises the following steps: using a plurality of pedestals to support a basket, inserting a transportable drive unit under the basket, jacking up the basket through use of a plurality of jacking cylinders arranged around a periphery of the transportable drive unit in order to remove or to retract the plurality of pedestals supporting the basket, jacking down the jacking cylinders to bring the basket into contact with the transportable drive unit and when the basket is brought into contact with the transportable drive unit, starting one or more drive motors to spool the elongated element on or off the basket.

Figure 2:
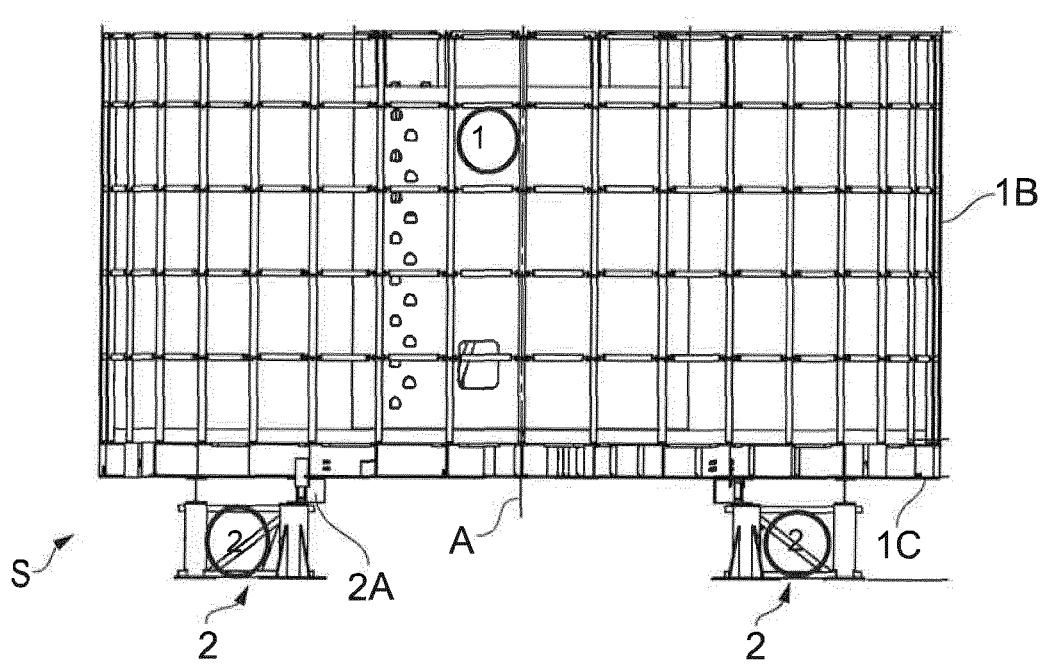
Figure 3:
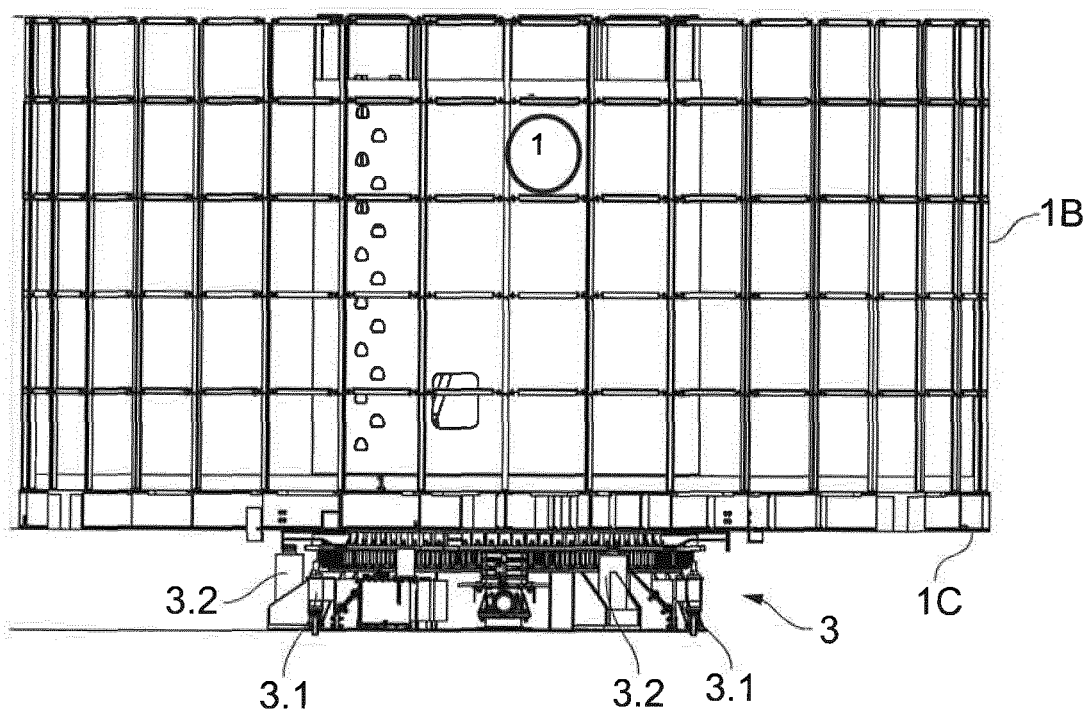
Figure 4:
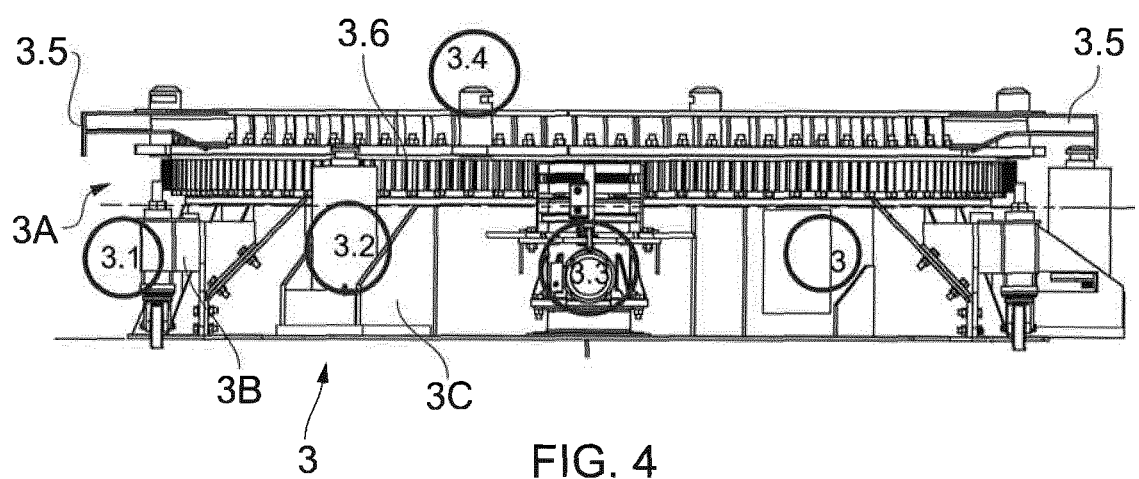
Figure 5A:
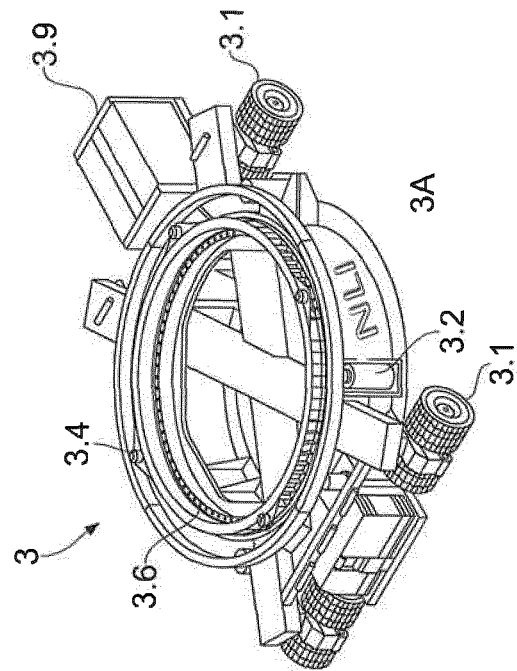
Figure 5B:
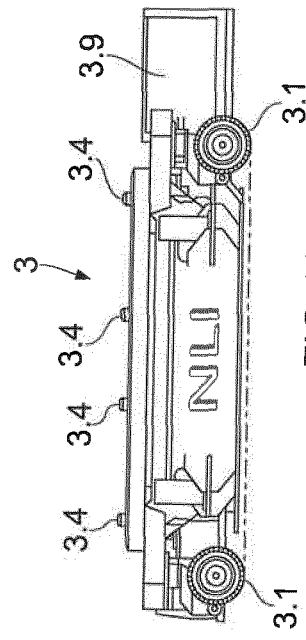
Figure 5C:
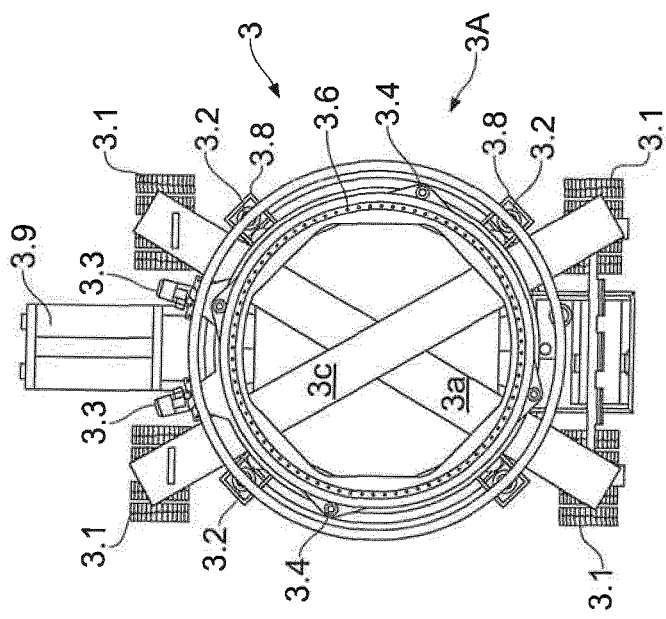
Figure 6A:
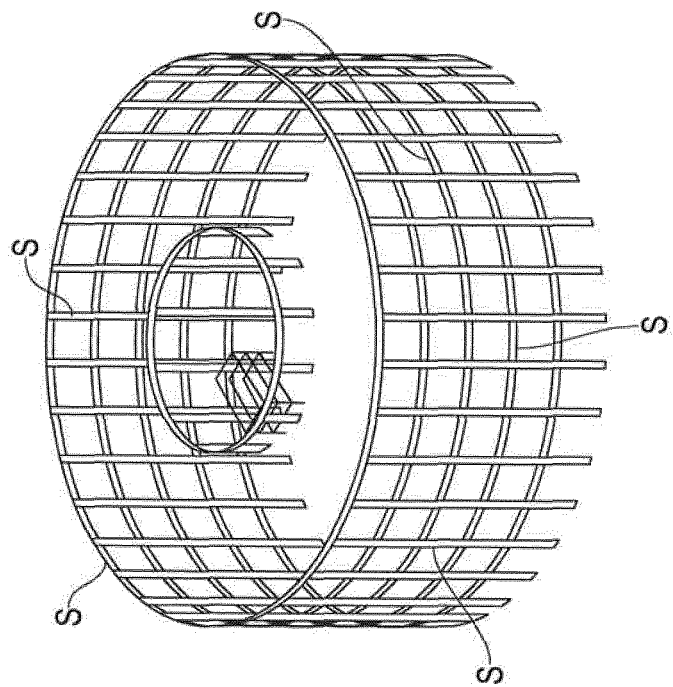
Figure 6A:
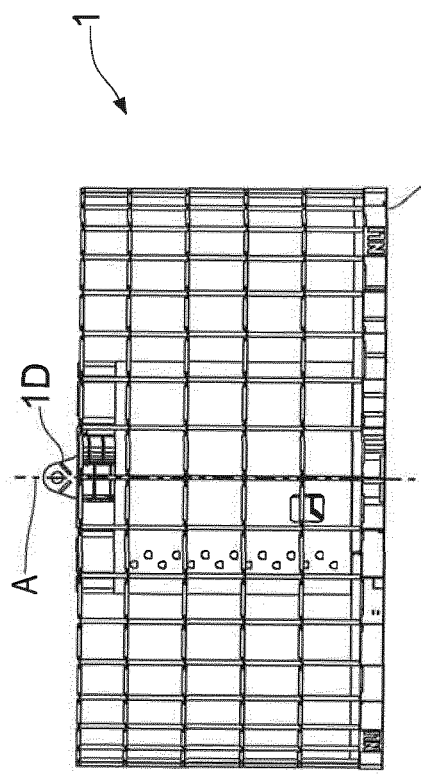
Figure 6B:
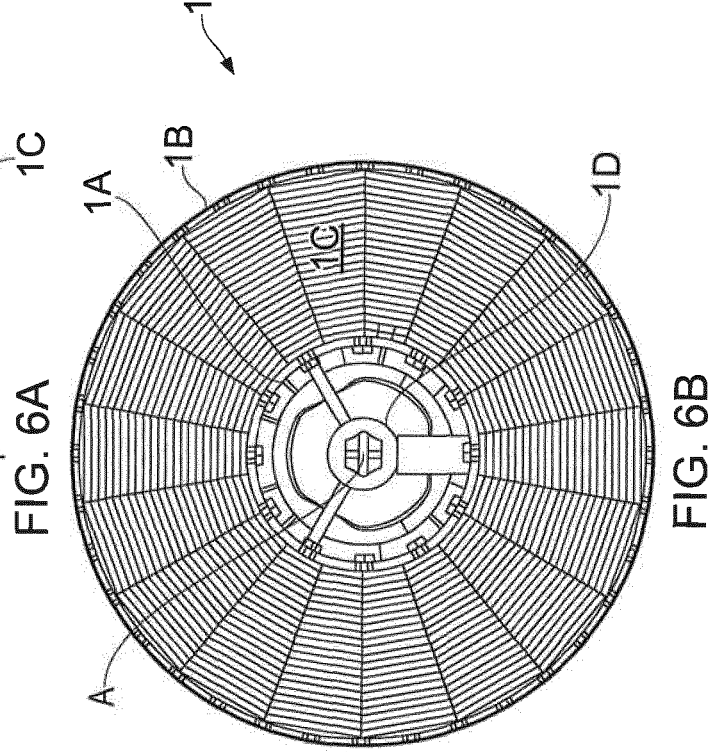
Figure 6C:
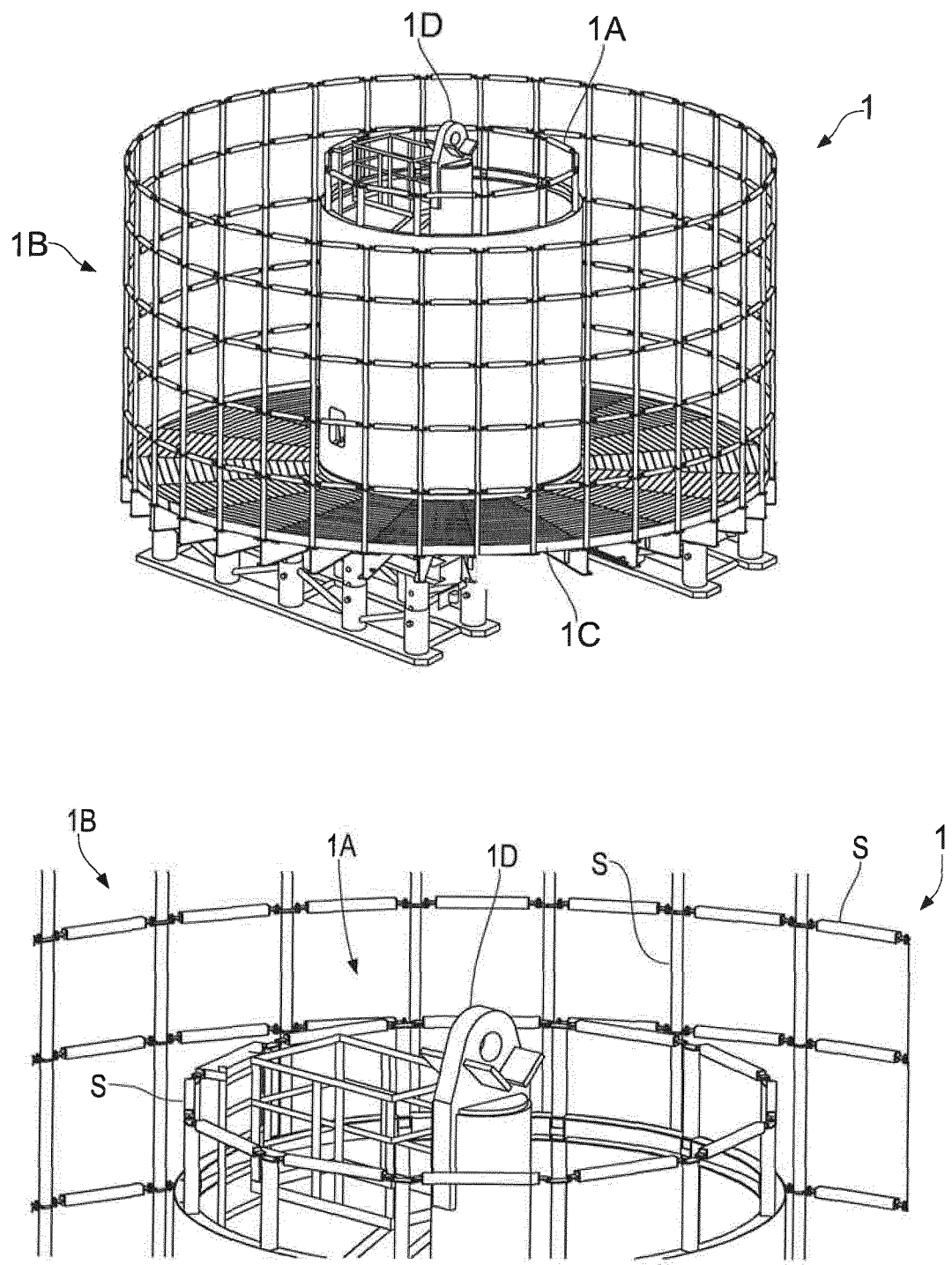
Figure 7A:
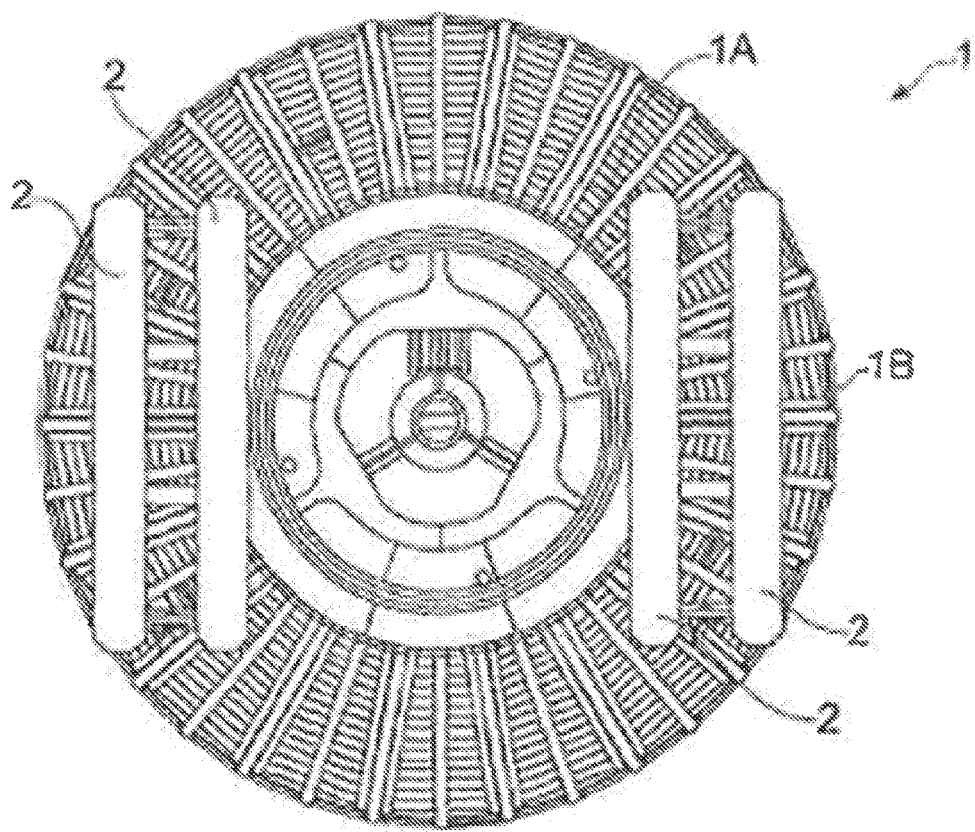
Figure 7B:
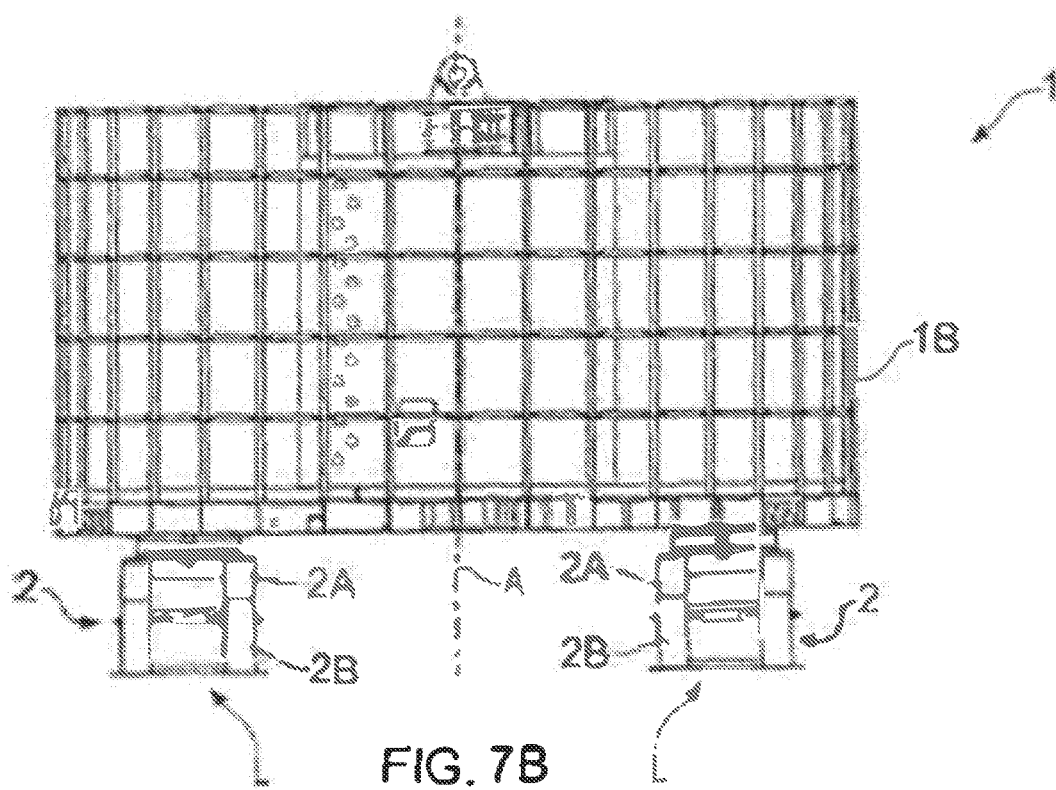
Figure 8A:
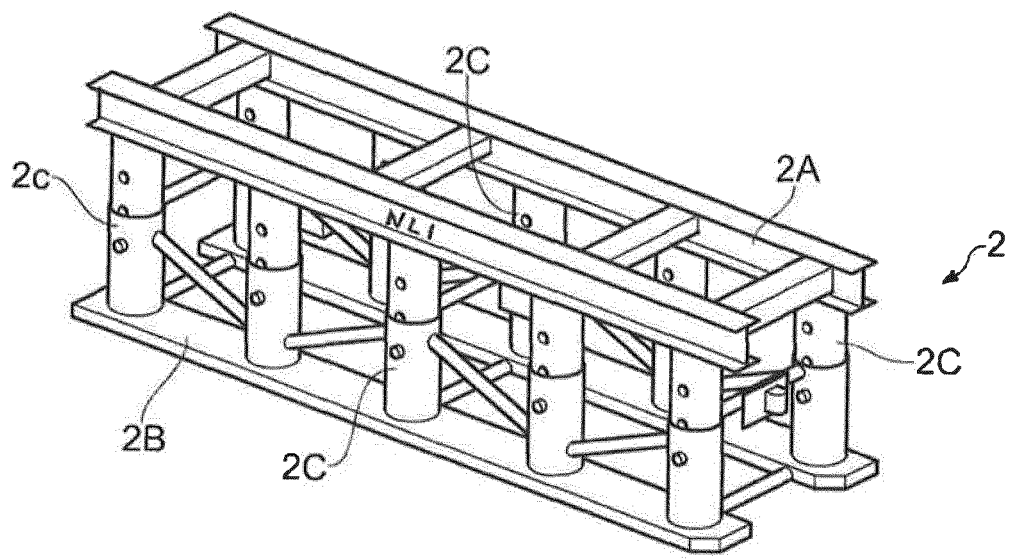
Figure 8B:
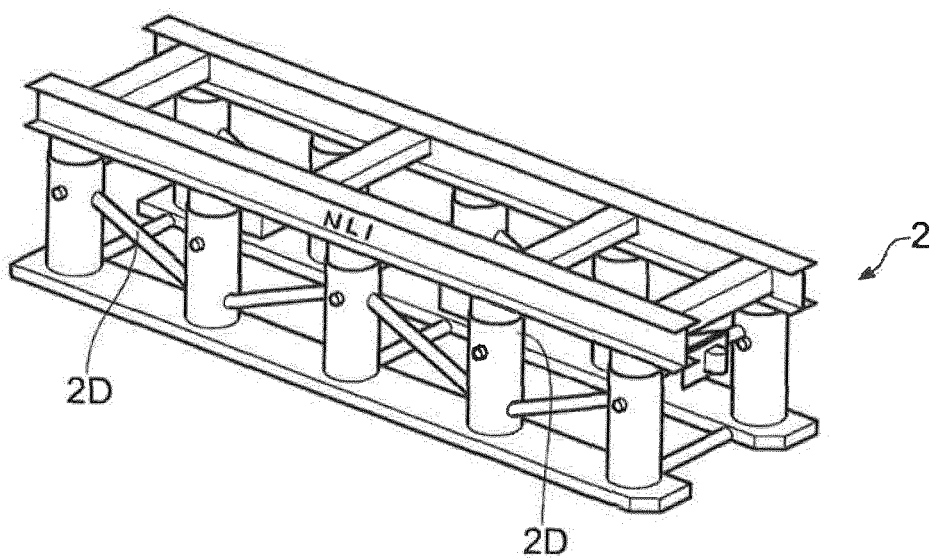
Figure 9A:
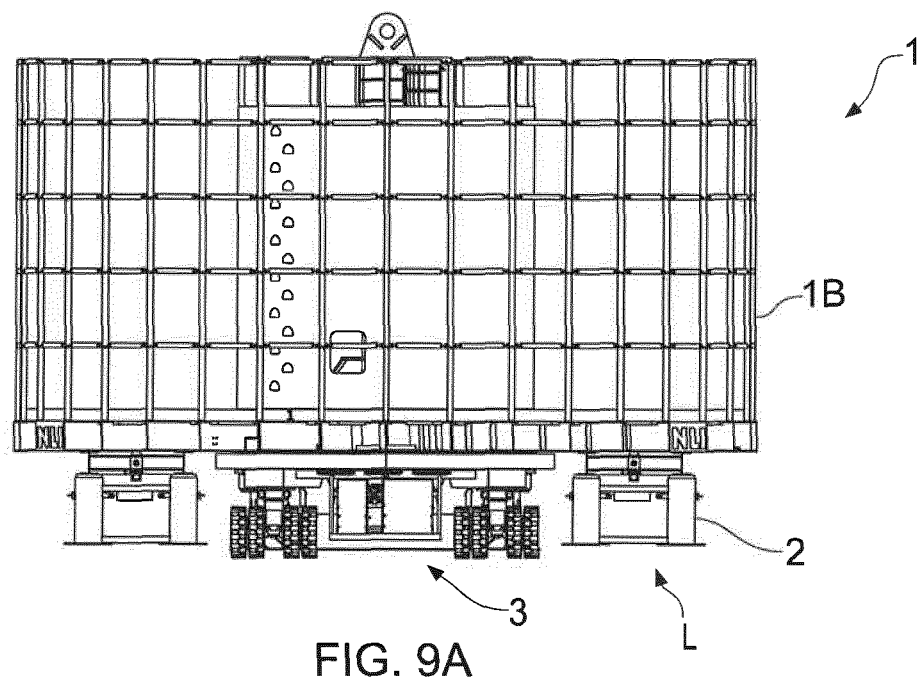
Figure 9B:
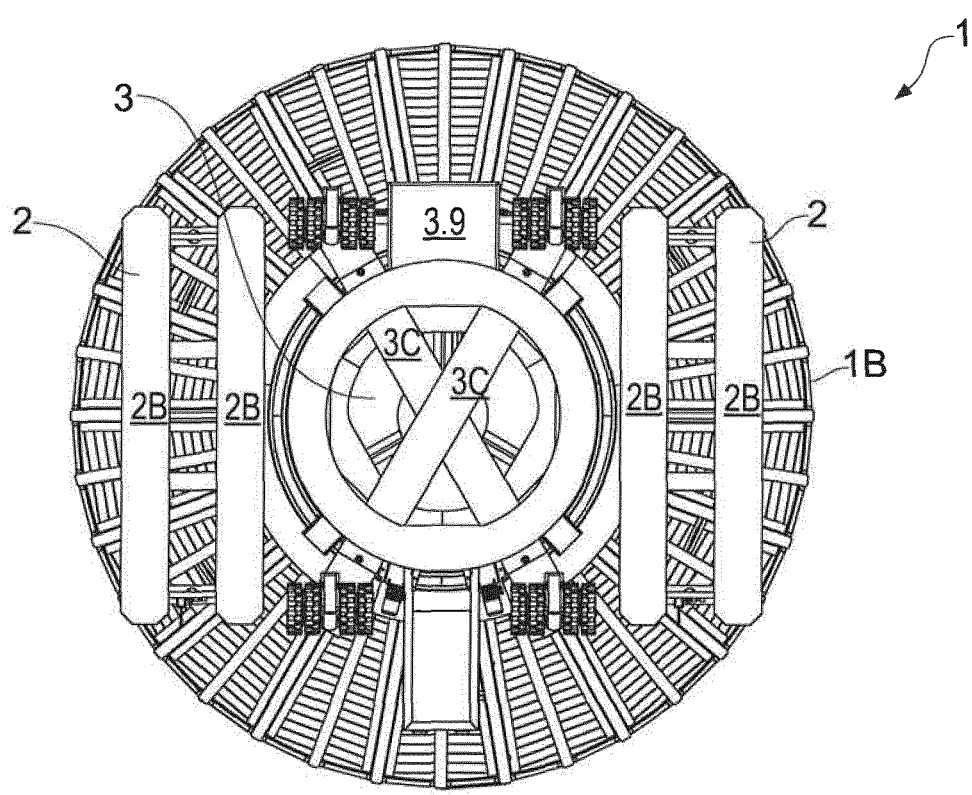

Other advantages and characteristics of the present invention will be apparent from the following detailed description, the appended drawings and the following claims, wherein FIG. 1 shows a system for handling, storing and transportation of an elongated element according to a first embodiment of the present invention in an assembled position, FIG. 2 shows the system for handling, storing and transportation of an elongated element according to FIG. 1, but where a transportable drive unit of the system is removed, FIG. 3 shows the system for handling, storing and transportation of an elongated element according to FIG. 1, but where pedestals of the system according to FIGS. 1-2 are removed, FIG. 4 shows a first embodiment of a transportable drive unit in greater detail, FIGS. 5A-5C show another embodiment of the transportable drive unit according to FIG. 4, seen in a perspective view, in a side view and from above, FIGS. 6A-6C show a basket of the system for handling, storing and transportation of an elongated element according to the present invention, where FIGS. 6A-6B show the basket in a side view and from above, while FIG. 6C shows a detail of the basket, FIGS. 7A-7B show another embodiment of a basket and pedestals of the system for handling, storing and transportation of an elongated element according to the present invention, seen from beneath and in a side view, FIGS. 8A-8B show a pedestal according to FIGS. 7A-7B in greater detail, and FIGS. 9A-9B show an alternative configuration of the system for handling, storing and transportation of one or more elongated element(s) according to FIG. 1, seen in a side view and from beneath.

The present invention relates to a system S for handling, storing and transportation of an elongated element (not shown), such as a cable, flexible pipe, control umbilicals including electrical cables or the like, where the system S comprises a basket 1, a plurality of pedestals 2 and a transportable drive unit 3.

The elongated element is spooled on or off the basket 1 and the basket 1 can be used to store and/or transport the elongated element.

The basket 1 is suitable for rotation about a central vertical axis A extending through a center of the basket 1 and comprises an interior upright wall 1A surrounding the central vertical axis A, and an exterior upright wall 1B spaced from and exterior to the interior upright wall 1A. The interior and exterior upright walls 1A, 1B are connected to a floor 1C, such that the interior upright wall 1A, the exterior upright wall 1B and the floor 1C define an open-topped chamber for receiving the elongated element.

A surface of the floor 1C of the basket 1 that faces the pedestals 2 and the transportable drive unit 3 is provided with interfaces (not shown in figures) which cooperates with corresponding interfaces provided in the pedestals 2 and the transportable drive unit 3.

The floor 1C of the basket 1 is also provided with a locking mechanism (not shown in figures) such that the basket 1 can be secured and locked to the transportable drive unit 3.

FIG. 6C show a detail of the basket 1, where a lifting yoke 1D is arranged in a center of the basket 1 and in appropriate ways connected to the floor 1C of the basket 1. A crane (not shown) can then be connected to the lifting yoke 1D in order to lift the basket 1. The basket 1 is designed to be lifted both empty and with full payload.

The exterior upright wall 1B comprises a plurality of dismountable stanchions S suitable connected to each other in order to accommodate different types of cable infeed systems. The interior upright wall 1A is a reinforced plated structure designed to withstand forces of vessel motion during voyage when the basket 1 is transported offshore. However, a person skilled in the art would know that the interior upright wall 1A also can be made from a plurality of dismountable stanchions S, that the exterior upright wall 1B can be made as a reinforced plated structure etc.

Each of the pedestals 2 is also provided with an interface (not shown) which cooperates with the corresponding interface provided in the floor 1C of the basket 1, such that the basket 1 can be supported by the pedestals 2 when the basket 1 is arranged on a plurality of pedestals 2. Furthermore, each pedestal 2 is also provided with guide brackets 2A extending towards the transportable drive unit 3 when the transportable drive unit 3 is arranged under the basket 1 and between two or more of the pedestals 2, as seen in FIG. 1, where the guide brackets 2A are used to guide and hold the transportable drive unit 3 into a required position underneath the basket 1.

In FIGS. 1 and 2, the pedestals 2 are separate units that must be removed in order to allow the basket 1 to rotate when the elongated element is spooled on or off the basket 1.

However, the pedestals 2 may also be collapsible fixed to the basket 1, as seen in FIGS. 7A-7B and 8A-8B, such that the pedestals 2 will "follow" the basket 1 when the basket 1 is relocated by the transportable drive unit 3. When the elongated element is to be spooled on or off the basket 1, the pedestals 2 must be retracted to an inactive position underneath the basket 1 in order to allow the basket 1 to rotate.

The pedestals 2 may also be arranged and fixed to the basket 1 in a collapsible way, such that the pedestals 2 can be brought from a supportive position supporting the basket 1 and to a retracted position underneath the basket 1 in order to allow the basket 1 to rotate.

In another embodiment, as shown in FIGS. 7A-7B and 8A-8B, the pedestals 2 comprise a raising and lowering system in order to be able to raise and lower the basket 1.

FIG. 4 shows the transportable drive unit 3 in greater detail, where it can be seen that the transportable drive unit 3 comprises a frame structure 3A, to which frame structure a drive motor 3.3 is connected to. Although only one drive motor 3.3 is shown, a person skilled in the art would understand that the transportable drive unit 3 could also comprise more than one drive motor 3.3. The drive motors 3.3 would then be arranged spaced apart around a periphery of the frame structure 3A. If, for instance, three drive motors 3.3 are used, then the drive motors 3.3 could be arranged at an angle of 120 degrees between each other or any other suitable angle.

A slew ring bearing 3.6 with a tooth rack is also arranged and fixed within the frame structure 3A of the transportable drive unit 3, where the slew ring bearing 3.6 will cooperate with a pinion (not shown) of the drive motor 3.3 in order to rotate the basket 1 when the basket 1 is in abutment with the transportable drive unit 3 and the elongated element is to be spooled on or off the basket 1.

Furthermore, a plurality of wheel packages 3.1 are also arranged around the periphery of the frame structure 3A (see FIGS. 1, 3 and 4), where the wheel packages 3.1 are arranged in such a way that they will "stabilize" the transportable drive unit 3 when it is in use. If, for instance, three wheel packages 3.1 are arranged around the periphery of the frame structure 3A, then the wheel packages 3.1 are arranged at an angle of 120 degrees between them. If four wheel packages 3.1 are arranged around the periphery of the frame structure 3A, then the wheel packages 3.1 are arranged at an angle of 90 degrees between them.

The wheel packages 3.1 are connected to brackets 3B connected to the frame structure 3A of the transportable drive unit 3, and can be disassembled from the brackets 3B if the transportable drive unit 3 is to be permanently fixed to the ground. The transportable drive unit 3 may, for instance, be permanently fixed in a seagoing vessel when the system according to the present invention is used offshore.

A first embodiment of the system S for handling, storing and transportation of an elongated element according to the present invention will be explained in view of FIGS. 1-4.

FIG. 2 shows the system S for handling, storing and transportation of the elongated element according to the present invention in an initial setup, where the basket 1 has been placed on top of a plurality of pedestals 2 (only two can be seen), such that the basket 1 is supported by the pedestals 2.

One or more winches (not shown) will then be used to pull the transportable drive unit 3 underneath the basket 1, where the guide brackets 2A of the pedestals 2 and the deflectors 3.5 of the transportable drive unit 3 will aid in guiding and centering the transportable drive unit 3 into a correct position underneath the basket 1, as seen in FIG. 2.

As the basket 1, due to the height of the pedestals 2, is positioned a distance above the transportable drive unit 3, the plurality of jacking cylinders 3.2 are operated in order to lift the basket 1 out of abutment with the pedestals 2, such that the pedestals 2 can be removed away from the basket 1.

When the pedestals 2 are removed, as shown in FIG. 3, the jacking cylinders 3.2 are retracted and the basket 1 is lowered into abutment with the transportable drive unit 3. A plurality of kingpins 3.4 provided around the slew ring bearing 3.6 will then enter corresponding interfaces provided in the floor of the basket 1. A locking mechanism (not shown) provided in the basket 1 is then released in order to lock or secure the basket 1 to the transportable drive unit 3 or to a vessel which is used to transport the basket 1. However, a person skilled in the art would know that the basket 1 and transportable drive unit 3 can be connected and/or secured to each other in other ways than by use of kingpins 3.4, such as bolts, male and female connectors or the like.

The elongated element can now be spooled on or off the basket 1.

When the elongated element is spooled on or off the basket 1, an opposite procedure will be used to "release" the transportable drive unit 3 from the basket 1, whereby the transportable drive unit 3 can be moved or transported to another basket 1 to which the elongated element is to be spooled on or off.

FIGS. 5A-5C show an alternative embodiment of a transportable drive unit 3 of the system according to the present invention, where the transportable drive unit 3 in this embodiment is self-propelled. The transportable drive unit 3 comprises a frame structure 3A, to which frame structure 3A two drive motors 3.3 are connected to.

A slew ring bearing 3.6 with a tooth rack is arranged and fixed within the frame structure 3A of the transportable drive unit 3, where the slew ring bearing 3.6 will cooperate with pinions (not shown) of the drive motors 3.3 in order to rotate the basket 1 when the basket 1 is in abutment with the transportable drive unit 3 and the elongated element is to be spooled on or off the basket 1.

Two crossing beams 3C extend through the frame structure 3A and a distance out from the frame structure 3A, where a self-propelled wheel package 3.1 is arranged at each and opposite end of each beam 3C.

A plurality of jacking cylinders 3.2 are arranged around the frame structure 3A, where each jacking cylinder 3.2 is arranged in a housing 3.8 fixed to the frame structure 3A. Furthermore, four kingpins 3.4 are arranged spaced apart around the circumference of the slew ring bearing 3.6.

Furthermore, the jacking cylinders 3.2 may also be used as shock absorbing elements when the basket 1 is lifted on and off the transportable drive unit 3.

The self-propelled wheel packages 3.1 are connected to an electrical power unit 3.9 for the wheel packages 3.1, where the electrical power unit 3.9 may comprise a diesel driven power generator. The transportable drive unit 3 may also be connected to an external power source. A person skilled in the art would know that the transportable drive unit could be driven in other ways, for instance by any source of fuel, an electric battery system or the like, whereby this is not described any further herein.

FIGS. 7A-7B and 8A-8B show another embodiment of a basket 1 of the system according to the present invention, where the basket 1 in this embodiment is provided with two collapsible pedestals 2 comprising a rising and lowering system L.

Each collapsible pedestal 2 comprises an upper frame structure 2A and a lower frame structure 2B, where each of the upper and lower frame structures 2A, 2B comprises two longitudinal beam elements connected by a plurality of transverse beams extending between the longitudinal beams. Furthermore, the upper and lower frame structures 2A, 2B are connected to each other through a plurality of telescopic elements 2C. Each telescopic element 2C comprises an outer element and an inner element arranged within the outer element, where the outer element of the telescopic element 2C will extend from the lower frame structure 2B and towards the upper frame structure 2A, while the inner element of the telescopic element 2C will extend from the upper frame structure 2A and towards the lower frame structure 2B.

A plurality of hydraulic jacks 2D are arranged between the upper and lower frame structures 2A, 2B, thereby connecting the upper and lower frame structure 2A, 2B. However, it should be understood that the hydraulic jacks 2D can also be connected to the telescopic elements 2C, where one end of each hydraulic jack 2D then is connected to the outer element of each telescopic element 2C and an opposite end of the hydraulic jack 2D then is connected to the inner element of the telescopic element 2C.

The upper frame structure 2A of the pedestal 2 is provided with connection means (not shown), such that the pedestal 2 can be connected to an underside of the floor 1C of the basket 1. The lower frame structure 2B of the pedestal 2 forms the support towards a surface.

The pedestals 2 will then, through the rising and lowering system L, be brought between an inactive and retracted position underneath the floor 1C of the basket 1 and an active and extended position where the pedestals 2 will support the basket 1. Through this arrangement, the pedestals 2 must not have to be removed during spooling operations of the basket 1, as the pedestals 2 can be brought to the inactive and retracted position. Such an arrangement will also cause that the pedestals 2 can be transported together with the basket 1 when the basket 1 is to be transported or relocated to another location.

The rising and lowering system L, i.e. the hydraulic jacks 2D, is connected to a monitoring and control system (not shown), where the monitoring and control system may monitor and control each pedestal 2 and/or each hydraulic jack 2D individually and/or together.

FIG. 7B shows the system S for handling, storing and transportation of the elongated element according to the present invention in an initial setup, where the basket 1 is placed on top of a pair of pedestals 2, such that the basket 1 is supported by the pair of pedestals 2.

The pedestals 2 are, through the rising and lowering system, elevated to such a height that the transportable and self-propelled drive unit 3 can be manoeuvred into a position beneath the basket 1.

In FIGS. 9A-9B is seen that the transportable and self-propelled drive unit 3 is positioned in a correct position underneath the basket 1. The basket 1 will in this position be arranged at a distance above the transportable and self-propelled drive unit 3, whereby the rising and lowering system is used to lower the basket 1 into abutment with the transportable and self-propelled drive unit 3.

A plurality of kingpins 3.4 provided around the sleeve bearing 3.6 will then enter corresponding interfaces provided in the floor of the basket 1. A locking mechanism (not shown) provided in the basket 1 is then released in order to lock or secure the basket 1 to the transportable drive unit 3.

The elongated element can now be spooled on or off the basket 1.

The invention has now been explained with the aid of several non-limiting exemplary embodiments. A person of skill in the art will understand that a number of variations and modifications can be made to the system and method for handling, storing and transportation of an elongated element as described within the scope of the invention as defined in the appended claims.

The invention claimed is:

1. A system for handling, storing and transportation of an elongated element, the system comprising:
   a basket suitable for rotation about a central vertical axis, the basket comprising:
   an interior vertically upright wall surrounding the central vertical axis, and
   an exterior vertically upright wall spaced from and exterior to the interior upright wall, wherein a distance from the exterior vertically upright wall to the central vertical axis is greater than a distance from the interior vertically upright wall to the central vertical axis,
   the interior and exterior vertically upright walls being connected to a floor, thereby defining a chamber open in a vertically upward direction for receiving the elongated element,
   wherein the system further comprises a plurality of pedestals and a transportable drive unit,
   wherein the basket, on a surface of the floor facing the plurality of pedestals and the transportable drive unit, is provided with interfaces which cooperate with corresponding interfaces provided in the plurality of pedestals and the transportable drive unit, and
   wherein neither the interior vertically upright wall nor the exterior vertically upright wall comprises the elongated element.

2. The system according to claim 1, wherein each of the plurality of pedestals is provided with at least one guide bracket.

3. The system according to claim 2, wherein the transportable drive unit further comprises a plurality of deflectors that cooperate with the at least one guide bracket to guide and center the transportable drive unit when the transportable drive unit is positioned under the basket.

4. The system according to claim 1, wherein the transportable drive unit comprises one or more drive motors.

5. The system according to claim 4, wherein each of the drive motors cooperate with a sleeve bearing connected to an upper surface of the transportable drive unit.

6. The system according to claim 4, wherein the transportable drive unit comprises a plurality of wheel packages.

7. The system according to claim 4, wherein the transportable drive unit further comprises a plurality of jacking cylinders.

8. The system according to claim 1, wherein the transportable drive unit comprises a plurality of wheel packages.

9. The system according to claim 8, wherein the plurality of wheel packages is releasably connected to the transportable drive unit.

10. The system according to claim 9, wherein the transportable drive unit further comprises a plurality of jacking cylinders.

11. The system according to claim 10, wherein the transportable drive unit further comprises a plurality of kingpins.

12. The system according to claim 11, wherein the transportable drive unit further comprises a plurality of deflectors.

13. The system according to claim 8, wherein each of the wheel packages comprises a spring device.

14. The system according to claim 8, wherein the transportable drive unit further comprises a plurality of jacking cylinders.

15. The system according to claim 1, wherein the transportable drive unit further comprises a plurality of jacking cylinders.

16. The system according to claim 1, wherein the transportable drive unit further comprises a plurality of kingpins.

17. The system according to claim 1, wherein the transportable drive unit further comprises a plurality of deflectors.

18. A method for handling, storing, and transportation of an elongated element, the method comprising:
- supporting a basket by a plurality of pedestals above a surface,
- inserting a transportable drive unit between the basket and the surface,
- jacking up the basket through use of a plurality of jacking cylinders arranged around a periphery of the transportable drive unit, such that the pedestals can be removed or retracted,
- jacking down the jacking cylinders to bring the basket into contact with the transportable drive unit, and
- when the basket is into abutment with the transportable drive unit, starting one or more drive motors of the transportable drive unit to spool the elongated element on or off the basket.

19. The method according to claim 18, wherein the transportable drive unit comprises the plurality of jacking cylinders.

* * * * *